US010679285B1

(12) United States Patent
Kurani et al.

(10) Patent No.: US 10,679,285 B1
(45) Date of Patent: Jun. 9, 2020

(54) SYSTEMS AND METHODS FOR REAL TIME CREDIT EXTENSION AND BILL PAY CONFIGURATION

(71) Applicant: Wells Fargo Bank, N.A., San Francisco, CA (US)

(72) Inventors: Ashish B. Kurani, Burlingame, CA (US); Nikolai Stroke, Gilbert, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1030 days.

(21) Appl. No.: 14/798,157

(22) Filed: Jul. 13, 2015

(51) Int. Cl.
G06Q 40/02 (2012.01)

(52) U.S. Cl.
CPC .................. G06Q 40/025 (2013.01)

(58) Field of Classification Search
CPC .................................................. G06Q 40/025
USPC ............................................................. 705/35
See application file for complete search history.

(56) References Cited

U.S. PATENT DOCUMENTS

| 6,385,594 | B1* | 5/2002 | Lebda .................. G06F 17/243 705/35 |
| 7,725,427 | B2 | 5/2010 | Bishop et al. |
| 8,412,625 | B2 | 4/2013 | Pilo' |
| 8,554,668 | B2 | 10/2013 | Hogan |
| 8,566,240 | B2 | 10/2013 | Smith et al. |
| 8,788,353 | B2 | 7/2014 | Hills |
| 8,793,184 | B2 | 7/2014 | Lakshminarayanan |
| 8,799,153 | B2 | 8/2014 | White et al. |

| 2004/0230534 | A1* | 11/2004 | McGough ............ G06Q 20/382 705/64 |
| 2007/0061255 | A1 | 3/2007 | Epting et al. |
| 2007/0288394 | A1* | 12/2007 | Carrott .................. G06F 21/10 705/78 |
| 2008/0319914 | A1* | 12/2008 | Carrott .................. G06Q 20/02 705/75 |
| 2011/0218905 | A1* | 9/2011 | Zeringue ............... G06Q 40/02 705/38 |
| 2012/0078781 | A1 | 3/2012 | Ross et al. |

(Continued)

FOREIGN PATENT DOCUMENTS

| KR | 20160080033 A | * | 7/2016 |
| KR | 101740911 B1 | * | 5/2017 |

OTHER PUBLICATIONS

"Technologies for Payment Fraud Prevention: EMV, Encryption and Tokenization." A Smart Card Alliance Payments Council White Paper. Publication Date: Oct. 2014 (Year: 2014).*

(Continued)

Primary Examiner — Sara C Hamilton
(74) Attorney, Agent, or Firm — Foley & Lardner LLP

(57) ABSTRACT

Systems and methods of completing purchase transactions that include a loan are disclosed. A system includes an account database configured to retrievably store information relating to at least one account associated with at least one customer and a network logic configured to enable the system to exchange information over a network. The system further includes a transaction processing logic, which is configured receive a loan application, generate a plurality of loan terms for the loan application, receive a related transaction package, tender a purchase price according to the transaction package, and set up a corresponding loan in an account database.

6 Claims, 7 Drawing Sheets

(56) References Cited

U.S. PATENT DOCUMENTS

| | | | |
|---|---|---|---|
| 2013/0036058 A1* | 2/2013 | Kelly | G06Q 20/322 705/67 |
| 2013/0054468 A1* | 2/2013 | Fuentes | G06Q 40/02 705/64 |
| 2014/0089191 A1 | 3/2014 | Brown | |
| 2014/0164251 A1* | 6/2014 | Loh | G06Q 20/065 705/67 |
| 2014/0207654 A1 | 7/2014 | Don et al. | |
| 2015/0350211 A1* | 12/2015 | Burgess | H04L 63/10 726/30 |
| 2016/0125412 A1* | 5/2016 | Cannon | G06Q 20/4014 705/44 |

OTHER PUBLICATIONS

Bank for International Settlements, Innovations in Retail Payments, Committee on Payment and Settlement Systems, May 2012, 96 pages.

Targeted News Service, Sage Launches New Mobile Payments Product, Says 'No' to Mobile Processing Fees, Feb. 7, 2011, 4 pages.

* cited by examiner

SYSTEMS AND METHODS FOR REAL TIME CREDIT EXTENSION AND BILL PAY CONFIGURATION

BACKGROUND

Paying for goods and services in full with cash or a credit card may not be desirable or even possible, particularly for big-ticket items. A common alternative method of payment is a loan, however, obtaining and servicing loans can be inconvenient and time consuming. A given consumer typically needs to apply for a loan, wait until the loan is underwritten and approved, and subsequently make arrangements to provide loan payments at regular intervals. The customer can provide payments to a loan's corresponding creditor by sending paper checks or through a bill pay feature offered by a financial institution.

SUMMARY

One example embodiment relates to a financial institution computing system. The system includes an account database, an FI network logic, and a transaction processing logic. The account database is configured to retrievably store information relating to at least one account associated with at least one customer. The FI network logic is configured to enable the financial institution computing system to exchange information over a network. The transaction processing logic is configured to receive a loan application through the FI network logic and generate a plurality of loan terms for the loan application. The transaction processing logic is further configured to receive a transaction package through the FI network logic, wherein the transaction package includes at least one of the plurality of loan terms and a purchase price. The transaction processing logic is configured to tender the purchase price according to the transaction package and set up a loan in the account database according to the transaction package.

Another example embodiment relates to a method of completing a purchase transaction that includes a loan. The method includes receiving, by a transaction processing logic, a loan application from a network and generating a plurality of loan terms for the loan application. The method further includes receiving, by the transaction processing logic, a transaction package from the network, wherein the transaction package includes at least one of the plurality of loan terms and a purchase price. The method includes tendering, by the transaction processing logic, the purchase price according to the transaction package and setting up a loan in an account database according to the transaction package.

Yet another example embodiment relates to a method of completing a purchase transaction that includes a loan. The method includes receiving, by a transaction processing logic, a loan application from a customer device sent over a network and generating a plurality of loan terms for the loan application. The method further includes receiving, by the transaction processing logic, a transaction package sent from the customer device over the network, wherein the transaction package includes at least one of the plurality of loan terms and a purchase price. The method includes tendering, by the transaction processing logic, the purchase price according to the transaction package and setting up a loan in an account database according to the transaction package.

DETAILED DESCRIPTION

According to various embodiments, systems and methods for completing purchase transactions involving a loan is provided. At a high level, a consumer can identify a desired good or service, apply for a loan from a financial institution, and use that loan to purchase the desired good or service. As part of issuing the loan, the financial institution can set up a corresponding bill pay feature to allow the customer to pay off the loan, which may include an automatic bill pay function.

Figure 1:
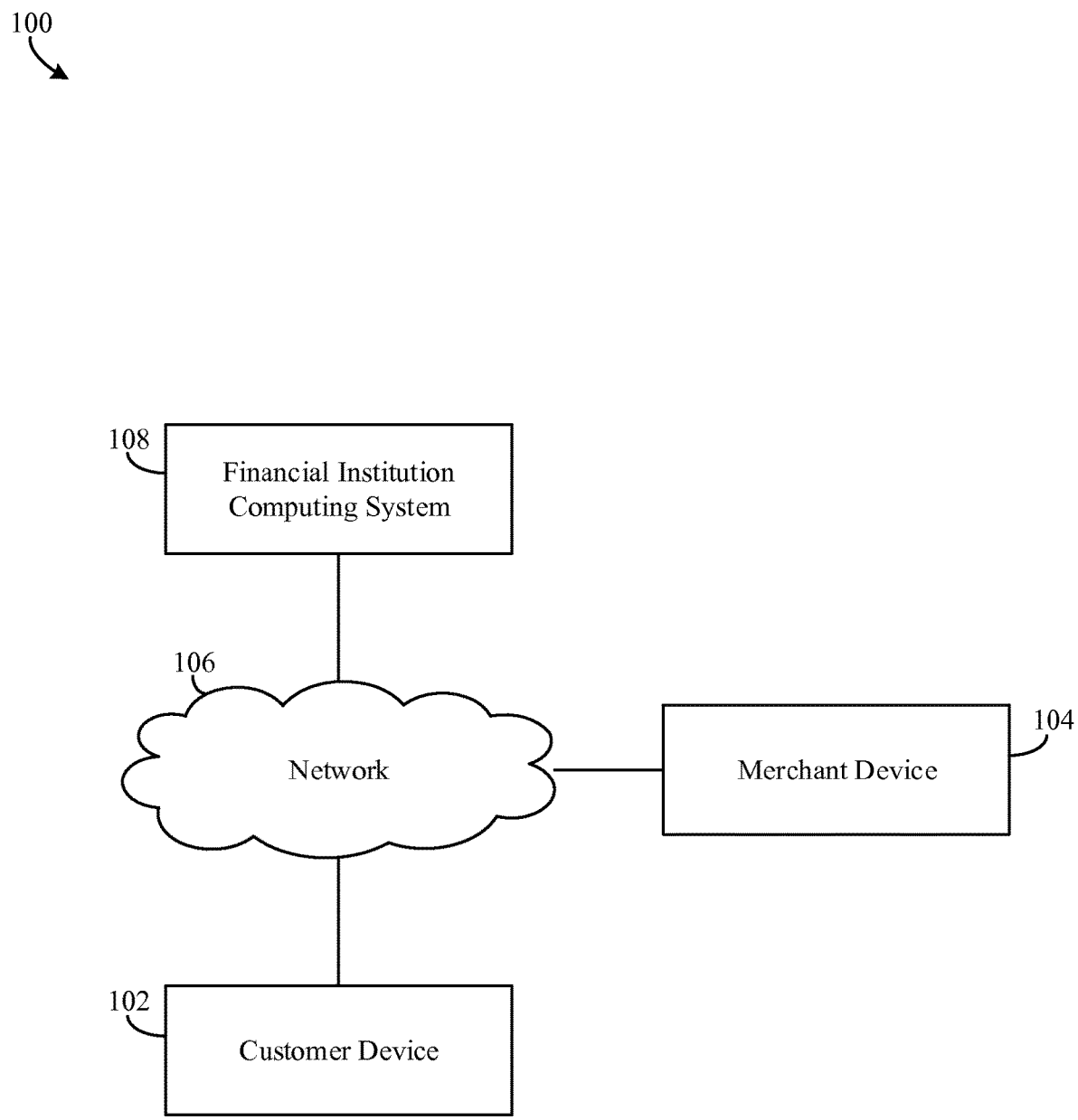
FIG. 1 is a block diagram illustrating a purchase transaction system, according to an example embodiment.

Referring now to FIG. 1, a transaction system 100 includes a customer device 102, a merchant device 104, a network 106, and a financial institution computing system 108. The transaction system 100 is configured to enable a customer to quickly and easily procure a loan sufficient to complete a purchase of a good or service, and to facilitate subsequent customer payments toward the loan. The customer device 102 is a personal computing system associated with a customer, and may include mobile devices (e.g., mobile phones, smartphones, tablets, wearable computing devices such as eyewear, laptop computers, and so on) or more stationary computing systems (e.g., desktop computers, virtual desktop portals, and so on). The merchant device 104 may be a computing system similar to the customer device 102, except that the merchant device 104 is associated with a vendor of goods or services (e.g., a point of sale device at a brick and mortar facility). Further, in some arrangements, the merchant device 104 may be an enterprise computing system that is provided by a plurality of networked computing systems (e.g., where an enterprise computing system services multiple franchise locations of a common merchant). The financial institution computing system 108 is a computing system at a financial entity that is capable of providing loans to a customer. In the context of the present disclosure, the financial entity can include financial institutions such as commercial or private banks, credit unions, investment brokerages, and so on. Finally, the network 106 is a data exchange medium communicatively engaged to the customer device 102, the merchant device 104, and the financial institution computing system 108, and may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 106 includes the internet.

In operation, a customer can identify a desired good or service with a corresponding purchase price either in person (e.g., at a brick and mortar facility associated with a merchant) or virtually on a computing device (e.g., the customer device 102 or the merchant device 104), and attempt to complete the purchase using a loan. The customer can use a computing device (e.g., the customer device 102 or the merchant device 104) to provide information sufficient to complete a loan application (e.g., agreements to terms, underwriting authorizations, transaction-specific data such as price, and so on) to the financial institution computing system 108 over the network 106. The financial institution computing system 108 can underwrite the loan application, and provide a range of loan terms to the customer. Included in the loan terms are options for the customer to provide a portion of the purchase price through other methods of payment (e.g., a down payment from a credit card, a checking account, a gift card, and the like). The customer can select a desired transaction package (e.g., a loan and a down payment in cash from a checking account), and authorize a purchase transaction using the desired transaction package, which may be processed at a point of sale as a standard payment card transaction (e.g., using a credit card, a debit card, or a gift card). Upon receiving the customer's authorization, the financial institution can tender the purchase price to the corresponding vendor, and automatically set up the authorized loan and a corresponding bill pay feature to service the loan. The various features and functions of the system 100 is discussed in more detail below.

Figure 2:
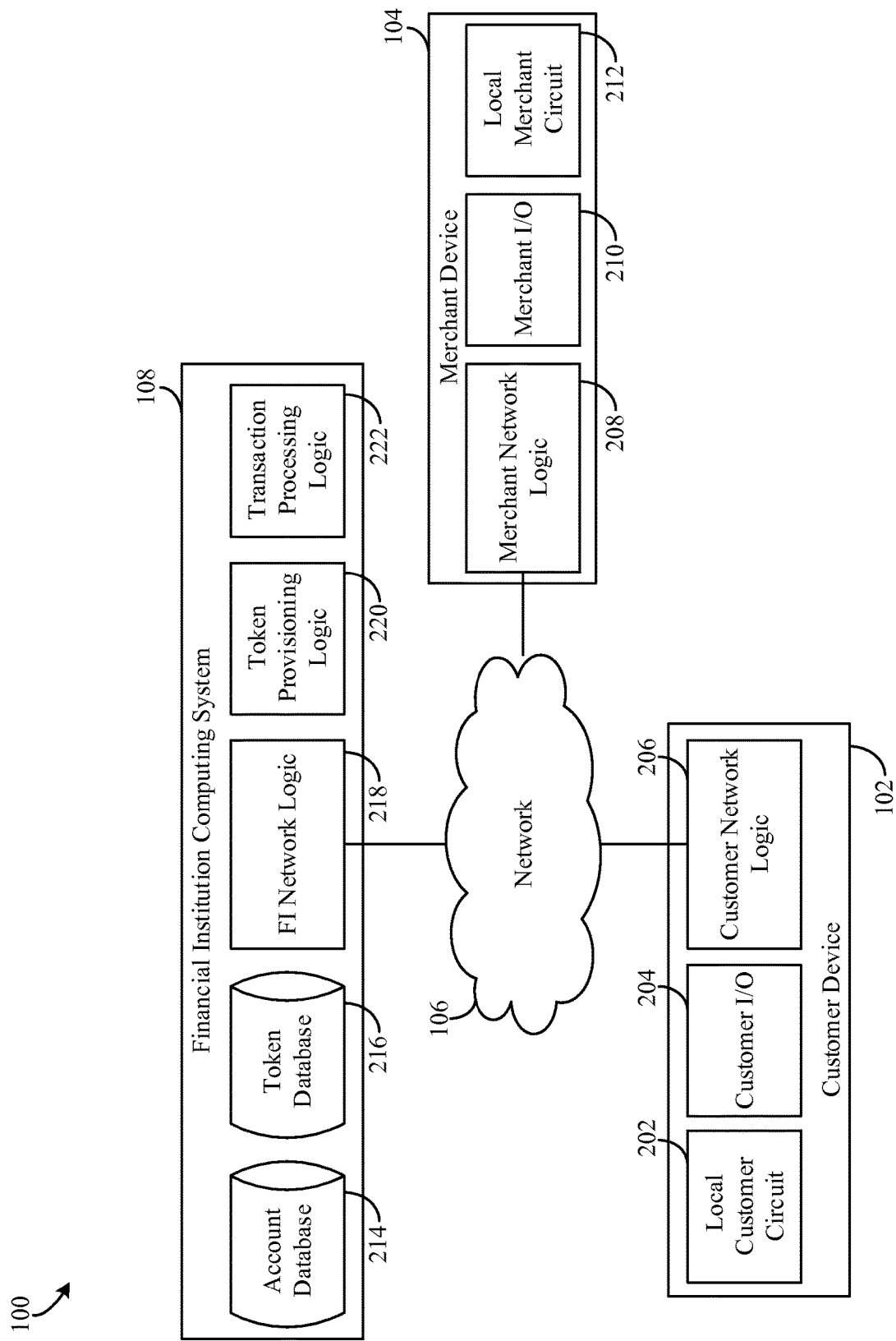
FIG. 2 is a block diagram illustrating additional features of the purchase transaction system shown in FIG. 1, according to an example embodiment.

Referring now to FIG. 2, the customer device 102 includes a local customer circuit 202, a customer I/O 204, and a customer network logic 206. The customer I/O 204 includes one or more features configured to provide an interface between a user and the customer device 102 itself. The customer I/O 204 is configured to both present digital information in such a way that is understandable to a user, and to receive and convert inputs from the user into digital information. The customer I/O 204 can include, for example, user input devices such as touchscreens, keyboards, mice, microphones (e.g., for voice recognition), image capture devices (e.g., scanners, cameras, and the like), short range communication devices (e.g., for RFID, NFC, etc. and corresponding receivers) and so on, as well as output devices such as monitors (e.g., displays based on CRT, LED, LCD, projection, and the like), speakers, and so on. The customer network logic 206 is configured to enable the customer device 102 to exchange information over the network 106.

The local customer circuit 202 may include program logic executable by the customer device 102 to implement at least some of the functions described herein. In order to make the local customer circuit 202, a provider (e.g., a software developer or publisher, or the financial institution itself) can make a software application available to be placed on the customer device 102. For example, a software developer may make the software application available to be downloaded (e.g., via the developer's website, via an app store, or in another manner). Responsive to a user selection of an appropriate link, the software application can be transmitted to the customer device 102 and cause itself to be installed on the customer device 102. Installation of the software application creates the local customer circuit 202 on the customer device. Specifically, after installation, the thus-modified customer device 102 includes the local customer circuit 202 (embodied as a processor and instructions stored in non-transitory memory that are executed by the processor). In other arrangements, the local customer circuit 202 can be a portal to a computing system configured to perform the operations discussed with respect to the local customer circuit 202, which may be made available to the customer device 102 (e.g., a website).

The merchant device 104 includes a merchant network logic 208, a merchant I/O 210, and a local merchant circuit 212, each of which may be similar to the customer network logic 206, customer I/O 204, and local customer circuit 202, respectively, depending on a given merchant. However, as mentioned above, the merchant device 104 is a computing device associated with a vendor of goods or services. As such, in one arrangement, the local customer circuit 202 is configured to perform operations sufficient to apply for and configure a loan in the manner discussed herein, while the local merchant circuit 212 is only configured to process purchase transactions (i.e., the local merchant circuit 212 is not configured to apply for and configure purchase loans). In such an arrangement, the customer can apply for and configure a transaction package that includes a new loan through the local customer circuit 202, and provide the transaction package to the merchant device 104 in the same manner as a regular purchase transaction involving a payment card (e.g., a credit card or a debit card). However, in another arrangement, the local merchant circuit 212 is configured to perform operations sufficient to apply for and configure loans in the same manner as the local customer circuit 202, as just discussed above. In such an arrangement, the customer can apply for and configure a loan and use that loan to complete a purchase transaction all at the merchant device 104. In yet other arrangements, the local customer circuit 202 and the local merchant circuit 212 can be configured to perform complementary operations, cooperating with each other to complete purchase transactions that include new loans.

The financial institution computing system 108 includes an account database 214, a token database 216, an FI network logic 218, a token provisioning logic 220, and a transaction processing logic 222. The account database 214 and the token database 216 are stored in non-transient data storage mediums, such as local disc or flash-based hard drives, local network servers, or remote data storage facilities (e.g., cloud servers). The account database 214 includes information on a plurality of customers with accounts at the financial institution, including for example, personal customer information (e.g., names, addresses, phone numbers, and so on) and customers' financial information (e.g., registered billers, account numbers, available credit, credit history, existing loans at the financial institution, and so on). As such, the information contained in the account database 214 includes relevant information for underwriting and issuing loans.

The token database 216 can include information pertaining to a plurality of tokenized information used to facilitate transactions involving customers of the financial institution. A token is a discrete, coded and/or encrypted segment of data that can be transmitted across the network 106 and stored in various digital storage media, including local storage devices in the customer device 102, the merchant device 104, and the financial institution computing system 208 (e.g., in the token database 216). In arrangements where the token database 216 is used, the token database 216 includes information as to at least one token provisioned by a token provisioning logic 220 in the manner discussed in more detail below. In other arrangements, however, tokens can be generated, used, and discarded in real time, and the token database 216 may not be needed.

A token may be any type of digital token or code suitable for use as a payment credential, such as a numerical code, an alphanumerical code, a collection of abstract characters, and so on. In some arrangements, the token is an encrypted copy of sensitive information itself (e.g., an encrypted charge account number). In other arrangements, the token is a unique digital tag that is associated with (i.e., instead of encoding) sensitive information (e.g., personal information, account information, authorizations and permissions, and so on) that can be interpreted by an authorized computing system (e.g., the token provisioning logic 220 can identify a given token, and retrieve the token's corresponding information from the token database 216).

The token provisioning logic 220 may be used to facilitate various data exchanges by providing for the use of tokens. The token provisioning logic 220 can, for example, provision (e.g., generate) new tokens, interpret existing tokens, authorize tokens for use in financial transactions, store tokens (e.g., in the token database 216), and manage token life cycles (e.g., where some tokens are set to expire and no longer be usable). The token provisioning logic 220 may be executed to provision tokens sufficient to complete a customer purchase that includes a loan. For example, the token provisioning logic 220 can be configured to provision tokens associated with various types of financial information, such as loan term tokens (e.g., where a token is associated with a term or a set of terms for a given loan package), payment tokens (e.g., where a token is associated with a method of payment, such as a credit card account or a checking account), application tokens (e.g., where a token is associated with a financial application, such as a loan application), transaction tokens (e.g., where a token is associated with a specific financial transaction, such as a transaction package), or account tokens (e.g., where a token is associated with a discrete customer account at a financial institution). Once generated, a given token may be exchanged instead of the actual financial information itself. The token provisioning logic 220 is configured to exchange information with the account database 214, the token database 216, and the transaction processing logic 222, along with remote systems over the network 106 via the FI network logic 218.

The token provisioning logic 220 may also be configured to link (i.e., assign) a token to a specific financial account (e.g., a line of credit, a checking account, a savings account, etc.) or a specific method of payment (e.g., a credit card, a debit card, a gift card, etc.). For example, a given token may be persistently linked to a corresponding credit card such that the credit card token may be re-used to make additional, subsequent payments using the same credit card (i.e., in lieu of actual credit card information). The token may also be linked to the credit card such that the credit card and/or the associated account holder must be periodically re-authenticated in order to use the token in subsequent transactions. The token may also be linked to any of an account holder, a customer device, a merchant device, a financial institution, and the like.

As an example, in operation, a customer can use the customer device 102 to request the financial institution computing system 108 to provision a payment token from the token provisioning logic 220 over the network 106 in order to conduct electronic transactions with a charge card (e.g., a credit card or a debit card). The payment token can subsequently be provisioned by the token provisioning logic 220 and received at the customer device 102. The customer may then identify a desired good and transmit the payment token to the merchant device 104 (e.g., via an NFC transmission, a visual bar code, a QR code, or the like from the customer I/O 204 to the merchant I/O 210). The merchant device 104 can transmit the payment token along with a purchase amount to the financial institution computing system 108 over the network 106. The token provisioning logic 220 can receive the payment token from the network 106 (i.e., via the FI network logic 218), interpret the payment token (e.g., by decrypting the token where the token includes a cryptogram, or comparing the payment token with token records in the token database 216, and the like), and recognize that the payment token relates to the customer's charge card. The token provisioning logic 220 may then cause the financial institution computing system 108 to enter a debit from the customer's charge card account and issue a corresponding payment to the vendor associated with the merchant device 104. Of note, throughout the purchase process just discussed above, the payment token was exchanged to complete the transaction in lieu of the customer's actual charge card information.

The transaction processing logic 222 is configured to facilitate customer purchases of goods and services by providing and servicing loans. The transaction processing logic 222 can be configured to receive and underwrite loan applications, execute transaction packages, and set up and maintain a bill pay feature. In performing these tasks, the transaction processing logic 222 can exchange data with the token provisioning logic 220, the account database 214, and remote systems over the network 106 via the FI network logic 218.

The transaction processing logic 222 can receive a loan application from a customer over the network 106 via the FI network logic 218. The loan application may sent to the financial institution computing system 108 where the customer is seeking to purchase a good or service using funds that are at least in part provided by a new loan. In some arrangements, the loan application is received as an application token associated with the customer, in which case, the transaction processing logic 222 cooperates with the token provisioning logic 220 to interpret the token and recognize that the token corresponds to a loan application from the customer.

The transaction processing logic 222 is configured to underwrite the loan application by considering various types of customer information to determine whether a loan should be granted, and if so, appropriate loan terms. In some arrangements, the transaction processing logic 222 is configured to underwrite loans in advance of receiving loan application information from the customer (e.g., where a customer may be pre-approved for a loan). In some arrangements, the transaction processing logic 222 underwrites loan applications as they are received. The transaction processing logic 222 can be configured to underwrite a given loan application based on information available in the account database 214 (e.g., account balances, payment histories, and so on). The transaction processing logic 222 can also be configured to use information received from third parties over the network 106 (e.g., credit reporting agencies, sources of public records such as default judgments, and so on) for the underwriting process. Where the transaction processing logic 222 ultimately concludes that a loan to the customer should be made, the transaction processing logic 222 can generate a set of approved loan terms, including for example, a total loan amount, a range of payment periods (e.g., a period defined in weeks, months, or years), a range of payment intervals (e.g., defining an interval of time between payments, which may be set by a number of weeks or months), or a range of interest rates (e.g., based on the range of payment periods and payment intervals generated), which may be organized into one or more loan packages.

The transaction processing logic 222 can be configured to transmit an approved loan application, including approved loan terms, back to the customer (e.g., back to the customer device 102 or the merchant device 104 over the network 106). In doing so, in some arrangements, the transaction processing logic 222 cooperates with the token provisioning logic 220 to transmit one or more approved loan packages back to the customer in the form of tokens. For example, the transaction processing logic 222 can cause the token provisioning logic 220 to issue a plurality of loan term tokens to the customer device 102, wherein each of the plurality of loan term tokens is associated with a loan package or a specific loan term. In some arrangements, the tokens can be provisioned such that a range of loan terms are conveyed to the customer. The local customer circuit 202 or the local merchant circuit 212 can be configured to interpret the tokens and present approved loan options to the customer.

The transaction processing logic 222 can be configured to receive a transaction package from the customer device 102 or the merchant device 104. The transaction package can include information sufficient to identify the customer's selected loan terms (i.e., selected among the approved loan terms or loan packages generated from the underwriting process), information sufficient to identify and complete transactions from other sources of funds (i.e., in addition to the approved loan), and an overall purchase price. In some arrangements, the transaction package is provided to the transaction processing logic 222 in the form of one or more tokens, which may have been prepared by the token provisioning logic 220, the local customer circuit 202, or the local merchant circuit 212.

In one arrangement, the transaction package is a transaction token that further includes one or more tokens at the customer device 102 (e.g., generated by the local customer circuit 202, or selected from the loan packages provided by the financial institution computing system 108) and then provided to the merchant device 104 (e.g., by a communication from the customer I/O 204 to the merchant I/O 210). The merchant device 104 can process the transaction token as a standard payment card transaction (i.e., the merchant device 104 can process the transaction token as though it was provided by a credit card or debit card transaction), and transmit the transaction token to the financial institution computing system 108 (e.g., as a transaction token over the network 106 via merchant network logic 108). For example, the token provisioning logic 220 can provision a transaction token in the same manner as a payment token corresponding to a credit card (e.g., where a credit card payment token is a sixteen-digit code, the transaction token is also a sixteen-digit code). The merchant device 104 can receive the transaction token, recognize it as a "credit card" payment token, and proceed to process the transaction in a similar manner (e.g., transmitting the transaction token, a purchase price, and a request for payment to a corresponding financial institution).

Upon receiving the transaction package, the transaction processing logic 222 can execute the transaction package. Where the transaction package is provided as one or more tokens, the transaction processing logic 222 can cooperate with the token provisioning logic 220 to interpret the transaction package and identify the transactions requested within. For example, a transaction package can include a purchase price for the customer's desired goods, an approved loan package, and down payment instructions. The down payment instructions can include, for example, a request for a debit for a first amount from a credit card account and a request for a debit for a second amount from a checking account. The transaction processing logic 222 can collect funds from each of the identified sources, or provide loan funds as the case may be, and provide the full purchase price to the corresponding vendor. In some arrangements, the transaction processing logic 222 first collects funds from each of the sources identified in the transaction package before issuing the full purchase price. In other arrangements, the transaction processing logic 222 first issues the full purchase price to the vendor and simultaneously or subsequently collects funds from the fund sources identified in the transaction package.

After issuing the purchase price to the vendor, the transaction processing logic 222 can set up and maintain a bill pay feature corresponding to the customer's selected loan package. The bill pay feature enables a customer of a financial institution to issue payments to registered billers. In operation, a customer can select a registered biller and/or configure a new registered biller containing a corresponding vendor's payment information (e.g., names, remittance addresses, account numbers, and the like). In some arrangements, the "registered biller" is actually the financial institution associated with the financial institution computing system 108 (e.g., where the financial institution issued a loan to the customer). After selecting a registered biller, the customer can cause the financial institution computing system 108 to issue payments (e.g., via paper or electronic checks) to satisfy debts, bills, and invoices with the corresponding vendor using funds from the customer's accounts at the financial institution. In some arrangements, the bill pay feature includes an auto pay function, where the bill pay feature can be configured to automatically cause payments of a specified sum to issue to an identified registered biller at specified intervals (e.g., where the auto pay function is directed toward a monthly debt such as a loan payment).

The financial institution computing system 108 can provide the bill pay feature to customers via a website or a software application that can be downloaded and installed on the customer device 102 (e.g., thereby assembling the local customer circuit 202). For example, the website or the application can be configured such that, upon providing a username and a personal identification number or password, a link to a "Bill Pay" function can be presented to the customer on the customer I/O 204. The customer can then interact with the "Bill Pay" link to cause the website or application to present a combination of instructions, menus, and interactive fields to allow the customer to set up new registered billers (e.g., by entering a vendor's name, remittance address, phone number, and the like into a new registered biller profile) or to generate a bill pay request.

Upon issuing the purchase price to a vendor, the transaction processing logic 222 can be configured to automatically set up the bill pay feature along with the auto pay function for the customer's approved loan package. In arrangements where the financial institution associated with the financial institution computing system 108 issued the customer's selected loan, the transaction processing logic 222 may label and consider the financial institution as a "registered biller," but bypass registration and payment formalities (e.g., the financial institution can directly debit the customer's accounts in accordance with the customer's loan package terms, including payment amounts, payment intervals, and so on). Further, information relating to at least one of the customer's financial accounts may be stored in the account database 214, and as such, the transaction processing logic 222 can configure the bill pay feature to directly debit the loan payments from the customer's account at the financial institution. Alternatively, the transaction processing logic 222 can configure the bill pay feature to debit the loan payments from one of the accounts identified in the transaction package (e.g., as included in the down payment instructions). Further, the transaction processing logic 222 can automatically configure an auto pay function to cause the bill pay feature to automatically debit loan payments at prescribed payment intervals. As a result, in such arrangements, the customer does not need to be directly involved in setting up the repayment process after configuring the transaction package.

As an example, in operation, a customer can walk into a brick and mortar store operated by a vendor of goods or services and identify a desired good. The customer can interface with the local customer circuit 202 through the customer I/O 204 on the customer device 102 to apply for a loan to fund the purchase of the desired good. The local customer circuit 202 can prepare and transmit a loan application (e.g., containing encrypted application data and/or one or more application tokens) over the network 106 through the customer network logic 206, where it is received by a corresponding FI network logic 218 at the financial institution computing system 108. Depending on the arrangement, the transaction processing logic 222 or the transaction processing logic 222 in conjunction with the token provisioning logic 220 (e.g., where the loan application includes a token) receives the loan application and proceeds to underwrite it. The transaction processing logic 222 can generate a plurality of approved loan terms, which may be organized into a plurality of loan packages. The token provisioning logic 220 can provision a corresponding plurality of loan term tokens and transmit the loan term tokens to the customer device 102 (e.g., over the network 106 and corresponding network logics 218, 206).

The local customer circuit 202 can receive the approved loan terms (e.g., loan packages, and/or loan term tokens) and present them to the customer (e.g., via the customer I/O 204). The customer can pick or adjust the available loan terms, as well as provide supplementary methods of payment (e.g., credit card information, debit card information, gift card information, and so on) to the local customer circuit 202 via the customer I/O 204. Ultimately, the customer configures a transaction package for the full purchase price of the desired good that includes an approved loan package, and in some arrangements, one or more supplementary forms of payment to be used in conjunction with the loan. In some arrangements, the local customer circuit 202 converts some or all of the transaction package into one or more tokens (e.g., one or more transaction tokens).

The customer can use the customer device 102 to convey the transaction package to the corresponding vendor of the desired good. In some arrangements, the customer I/O 204 provides the transaction package as one or more tokens to the merchant I/O 210 (e.g., through an NFC transmission, a QR code, a bar code, or the like), where the local merchant circuit 212 processes the one or more tokens as a simple payment card transaction (e.g., transmits the purchase price and the one or more tokens to the financial institution computing system 108 to request a corresponding payment).

The transaction processing logic 222 receives the transaction package from the merchant device 104 and proceeds to tender the purchase price to the corresponding vendor. In some arrangements, the transaction processing logic 222 issues the full purchase price up front, while in other arrangements, the transaction processing logic 222 executes all transactions contemplated in the transaction package in order to issue the full purchase price to the vendor. Upon issuing the full purchase price to the vendor, the transaction processing logic 222 can automatically set up a corresponding bill pay feature with an auto pay function to service the customer's approved loan package included in the transaction package.

As can be appreciated by one of skill in the relevant art, the above is but one possible example arrangement of the system 100. As an additional example, a customer can prepare and cause the transaction package to be executed in the absence of the merchant device 104, using the customer device 102 alone (e.g., where the purchase is completed on a vendor website). As another example, a customer can prepare and cause the transaction package to be executed in the absence of the customer device 102, using the merchant device 104 alone (e.g., where the local merchant circuit 212 performs substantially similar operations as the local customer circuit 202 as discussed above). Other arrangements are possible, based on the above description of the various components and associated features of the system 100.

Figure 3A:
FIGS. 3A-3C are depictions of various screens generated on a customer interface that may be used to obtain a loan, according to example embodiments.

Referring now to FIG. 3A, an application screen 310 of a customer graphical user interface 300 as presented by an I/O device (e.g., the customer I/O 204) on the customer device 102 is shown. The graphical user interface 300 provides a medium through which a customer can apply for a loan from a financial institution (e.g., the financial institution associated with the financial institution computing system 108). In some arrangements, the graphical user interface 300 is provided by a remote server as a website. In other arrangements, the graphical user interface 300 is provided by a local customer circuit (e.g., local customer circuit 202). The application screen 310 includes an indication of a financial institution (i.e., here, ABC Bank). The welcome screen 310 further includes a loan value field 311, which is an interactive data field with instructions for the customer to enter an estimated value of a desired loan. Afterwards, the customer may then select an interactive first button 312 to cause the local customer circuit to initiate a loan application process.

Figure 3B:
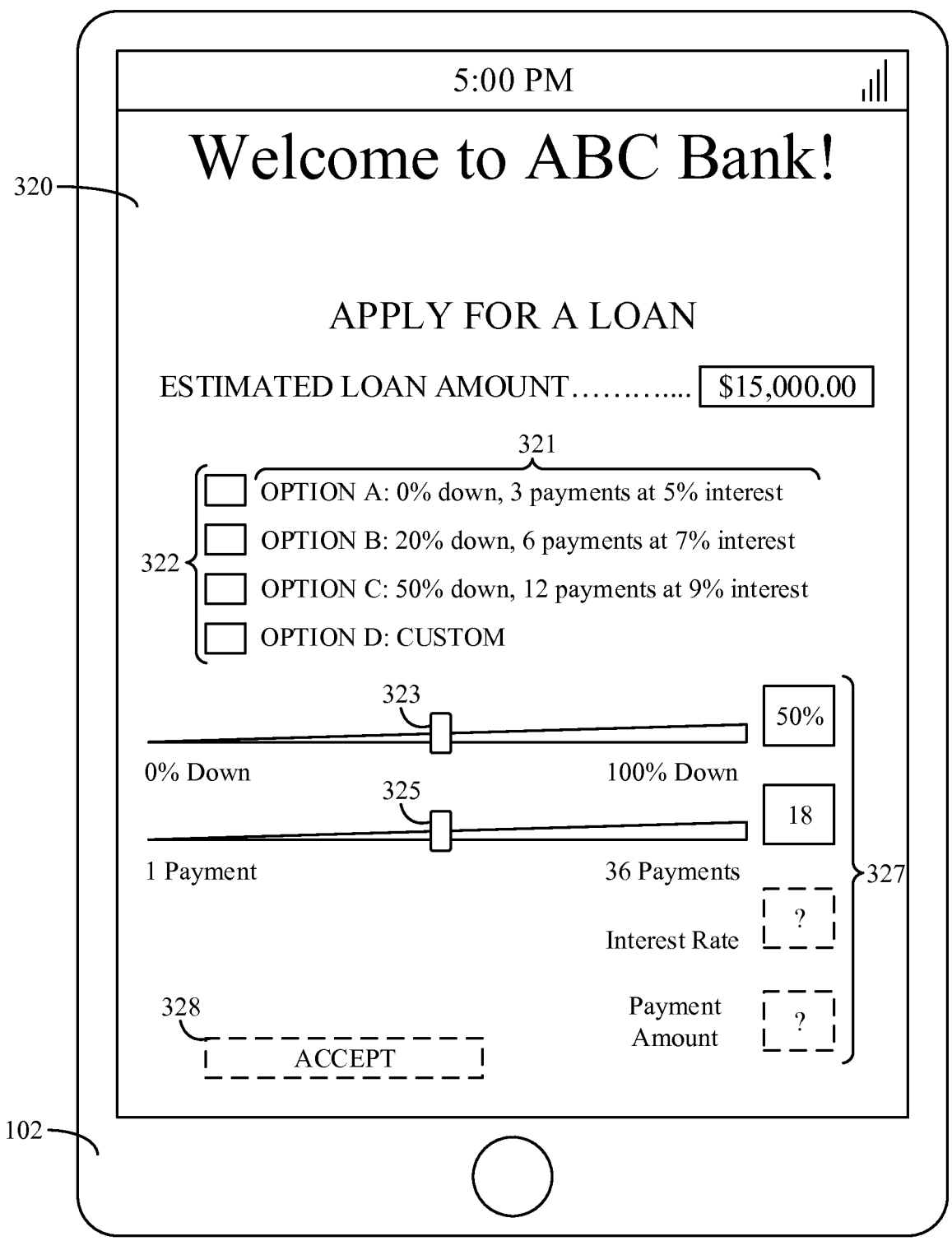

Referring now to FIG. 3B, in response to the customer selection of the first button 312, the graphical user interface 300 has refreshed to show a loan selection screen 320. The loan selection screen 320 includes a plurality of loan options 321 and a corresponding plurality of toggle boxes 322. Each of the plurality of loan options 321 includes a corresponding summary of loan term values (e.g., as shown, down payments, payment intervals, and interest rate), which are associated with one of the plurality of toggle boxes 322. The customer can select a given loan option by selecting the appropriate one of the plurality of toggle boxes 322. In some arrangements, each of the plurality of loan options 321 were provided by a financial institution computing system (e.g., financial institution computing system 108) as a token (e.g., a loan term token corresponding to a loan package Option A, another loan term token corresponding to a loan package Option B, and a third loan term token corresponding to a loan package Option C).

In some arrangements, the customer is able to configure a customized loan package. In the arrangement shown in FIG. 3B, the customer can select one of the plurality of toggle boxes 322 corresponding to an Option D to customize a loan package. The customer may then adjust certain terms of a loan, such as the amount of the down payment by translating an interactive down payment slider 323 along a corresponding down payment range. As such, the customer can configure the down payment to be anywhere from 0% (e.g., fully financed by a loan) up to 100% (e.g., not financed by a loan at all, but the purchase price may be allocated among several sources as discussed with respect to FIG. 3C, below). In addition, the customer may customize the number of loan payments by translating an interactive payment interval slider 325 along a corresponding payment interval range (e.g., from 1 payment to 36 payments).

Based on the customer's configuration of the down payment slider 323 and the payment interval slider 325, the loan selection screen 320 populates a corresponding set of loan term values 327. For example, the set of loan term values 327 can reflect the position of the down payment slider 323 and the payment interval slider 325 along their respective ranges. In addition, the customer device 102 (e.g., via the local customer circuit 202) can populate additional terms in the set of loan term values 327 that are dependent on the customer's selected values (e.g., interest rate, payment amounts, and so on). For example, the interest rate can be raised as the associated risk of the customer's selected terms increase (e.g., more payment intervals, or a lower down payment), and lowered with decreasing associated risk. In some arrangements, the interest rate calculation can be provided by the corresponding financial institution computing system after underwriting the customer's loan application (e.g., generally higher interest rates for high-risk customers, and generally lower interest rates for low-risk customers). Factoring in the customer's selected down payment amount, number of payment intervals, and the generated interest rate, the set of loan term values 327 can also include the loan payment amount as well. Upon selecting a satisfactory loan option (e.g., one of the pre-configured loan options, or a custom loan option), the customer can select the second button 328 to indicate an approval of the selected loan option and advance the loan application process.

Figure 3C:
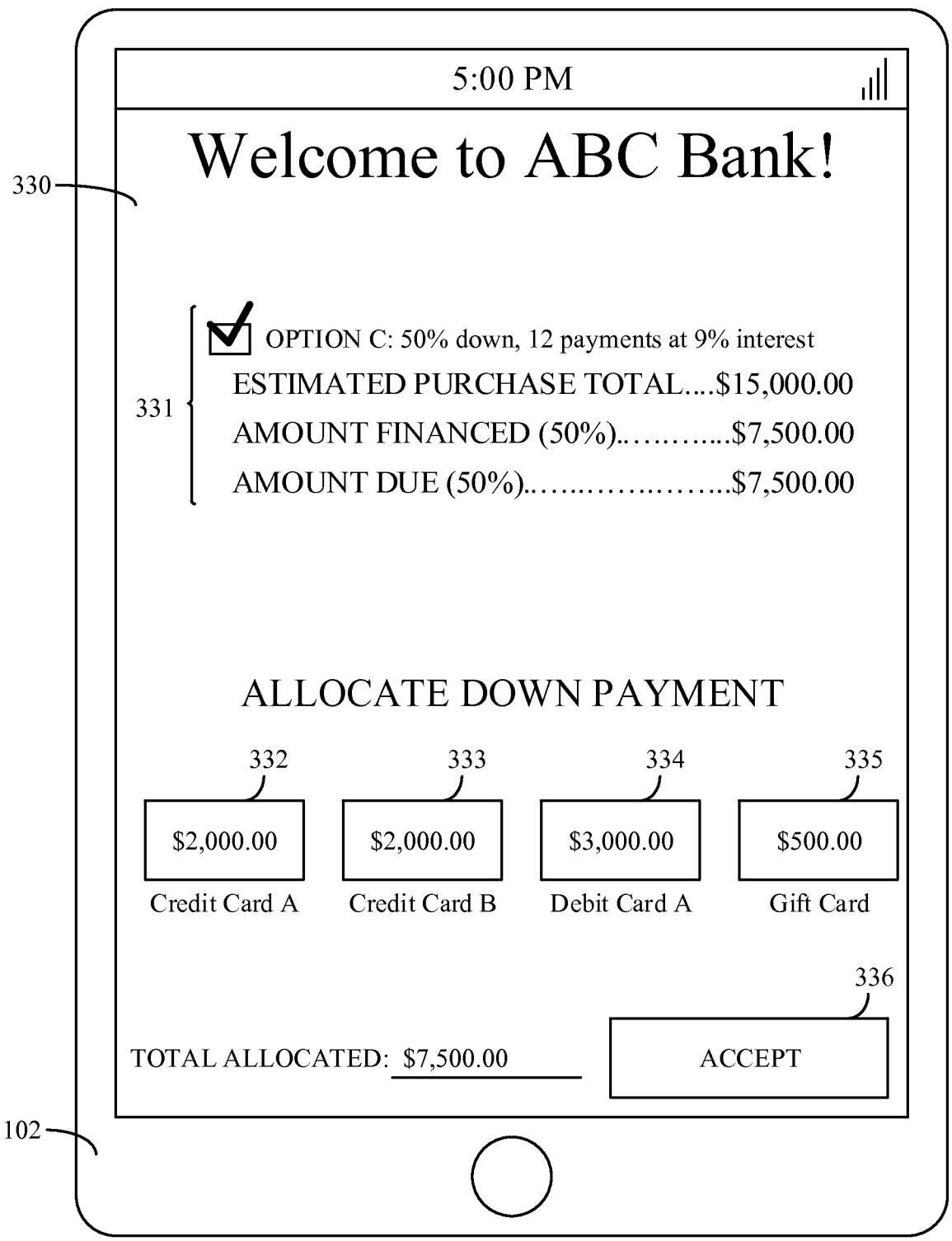

Referring now to FIG. 3C, a down payment allocation screen 330 enables the customer to configure the payment of the down payment term of the selected loan option. The down payment allocation screen 330 includes a selected loan summary 331, which contains information relating to the customer's selected loan (e.g., as discussed with respect to FIG. 3B, above). Included in the selected loan summary 331 is the estimated amount due, which corresponds to the remaining balance of the anticipated purchase price after accounting for the selected loan. In the arrangement shown, the amount due is $7,500.00.

The customer may allocate the amount due across several methods of payment. For example, the customer may allocate values to one or all of a first payment type 332 (e.g., a first credit card), a second payment type 333 (e.g., a second credit card), a third payment type 334 (e.g., a debit card), and a fourth payment type 335 (e.g., a gift card), to total the $7,500.00 down payment. In some arrangements, some or all of the payment types may correspond to payment tokens stored in a token database (e.g., the token database 216, as provisioned by the token provisioning logic 220). Additional payment types (e.g., a new debit card or a new gift card) may be added and used toward the down payment as well.

Upon configuring the allocation of the down payment, the customer can select a third button 336 to finalize a transaction package, which can include an approved loan package and corresponding down payment instructions. The transaction package may then be used to complete the purchase process. In some arrangements, the transaction package includes one or more tokens that a financial institution can interpret and recognize as an approved loan package and corresponding down payment instructions. In some arrangements, the transaction package is conveyed to the vendor at a point of sale (e.g., the customer device 102 provides an NFC transmission, a bar code or a QR code, or an alphanumeric code, or the like to the corresponding merchant device 104). In other arrangements, the transaction package is conveyed to the vendor over a network (e.g., the network 106, where the customer is accessing a vendor website or using a vendor software application on the customer device 102). The vendor may then use the transaction package to request a payment of the purchase price from the corresponding financial institution, and complete the sale of the good or service.

Figure 4:
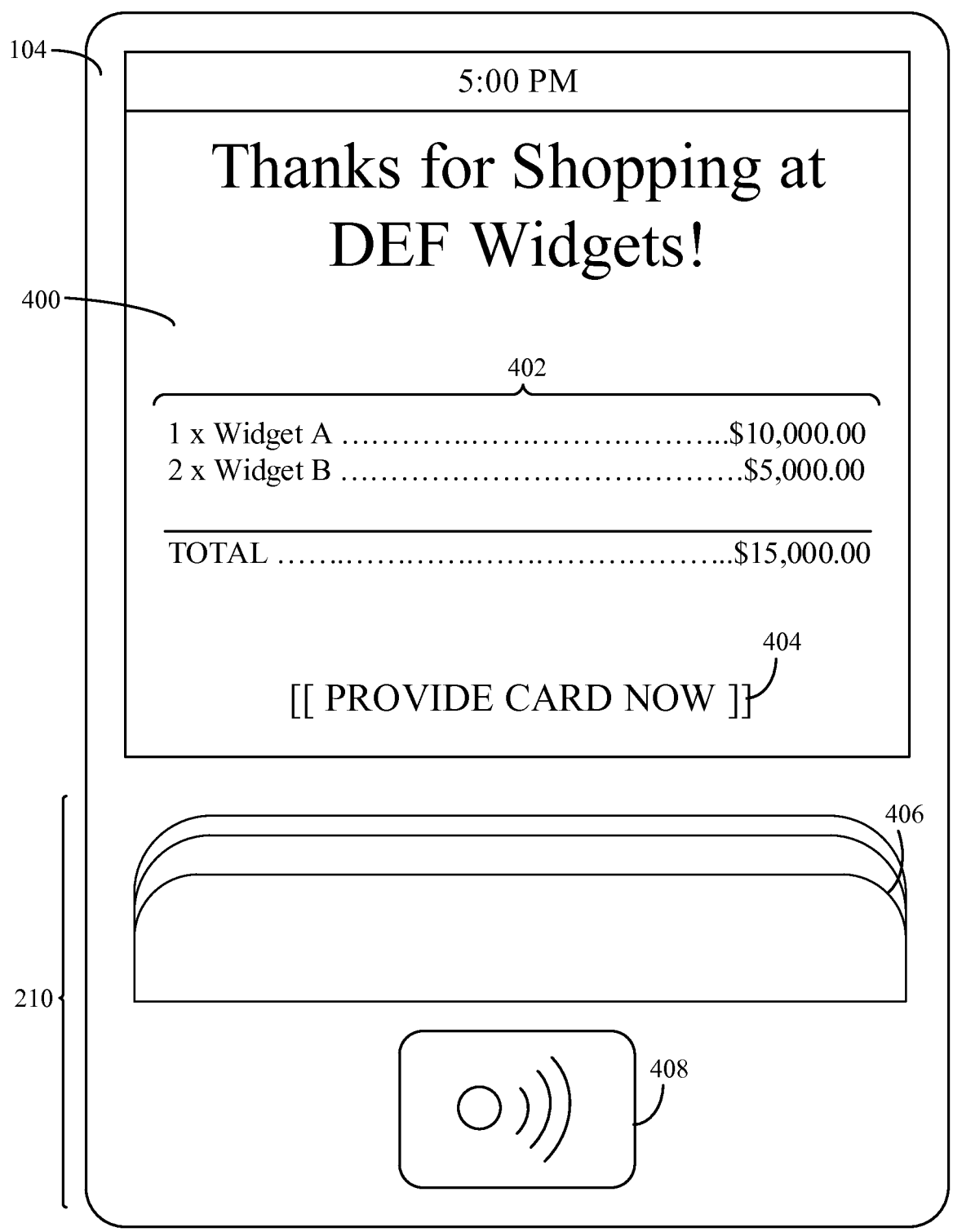
FIG. 4 is a depiction of a screen generated on a merchant interface that may be used to facilitate a purchase of goods or services, according to an example embodiment.

Referring now to FIG. 4, a merchant graphical user interface 400 (e.g., as presented by an output aspect of the merchant I/O 210) on the merchant device 104 (e.g., a point of sale in a brick and mortar location) allows the customer to complete a purchase transaction for the customer's desired goods or services. The merchant graphical user interface 400 includes sale information 402, a first instruction 404, a card reader 406 (e.g., an input aspect of the merchant I/O 210), and a contactless reader 408 (e.g., another input aspect of the merchant I/O 210). The sale information 402 includes a listing of the customer's desired products or services for purchase (e.g., here, Widget A and Widget B), including corresponding quantities and prices, and a total purchase price (e.g., here, $15,000.00).

The card reader 406 and the contactless reader 408 are each an embodiment of the input aspect of the merchant I/O 210. The card reader 406 is a device configured to receive payment information from a payment card (e.g., a credit card, a debit card, or a gift card) sufficient to complete a transaction that includes a debit from an associated charge account. In one arrangement, the card reader 406 is configured to read information from a payment card that is stored on a magnetic strip disposed on the payment card. The contactless reader 408 is configured to receive payment information stored on payment cards and devices having contactless capabilities. In one such arrangement, the contactless reader 408 is configured to receive payment information via an NFC transmission from an NFC chip disposed in a payment card. In another such arrangement, the contactless reader 408 is configured to receive payment information from a customer device (e.g., customer device 102) that is configured to transmit data via an NFC transmission (e.g., a customer I/O 204 that includes an NFC function). In some arrangements, the payment information received includes a cryptogram. In some such arrangements, the payment information received includes a token (e.g., a payment token, or a transaction token).

In the arrangement shown, the first instruction 322 indicates that the customer should provide payment information to the merchant device 104. The customer can provide payment information by, for example, entering a payment card number (e.g., via the merchant I/O 210 in the form of a touchscreen or keyboard), swiping a payment card using the card reader 406, or transmitting data from a payment card or a customer device using the contactless card reader 408. In some arrangements, providing the payment information results in a payment token or a transaction token being disposed in the merchant device 104 (e.g., a payment card or a customer device transmits the token directly to the merchant device 104), which a financial institution may use to identify the payment card, the customer, and/or a transaction package (i.e., including the contents therein).

Upon receiving payment information from a customer's payment card or customer device, the merchant device 104 can transmit the payment information to a corresponding financial institution to complete the purchase transaction. The financial institution can receive the payment information, which in some arrangements, includes a purchase price and a transaction token corresponding to a loan package and a set of down payment instructions. The financial institution can set up the loan corresponding to the loan package, execute the down payment instructions, and tender the corresponding purchase price an account associated with the merchant.

In some arrangements, the purchase price does not match the value of the sum of the down payment and the loan. In some such arrangements, the loan terms and/or down payment instructions can be pro-rated according to the actual purchase price (e.g., increasing or decreasing all appropriate values in the associated transaction package by the percent discrepancy between the purchase price and the transaction package value). In some arrangements, the difference is added or subtracted from one of the down payment value and the loan package value. In yet other arrangements, the customer is notified of the discrepancy (e.g., via a notice received by the local customer circuit 202 over the network 106), and is requested to re-apply for a loan using the correct purchase price. In some such arrangements, the merchant device 104 receives a notice that the customer's payment information is declined, and suggests that the customer try again.

Figure 5:
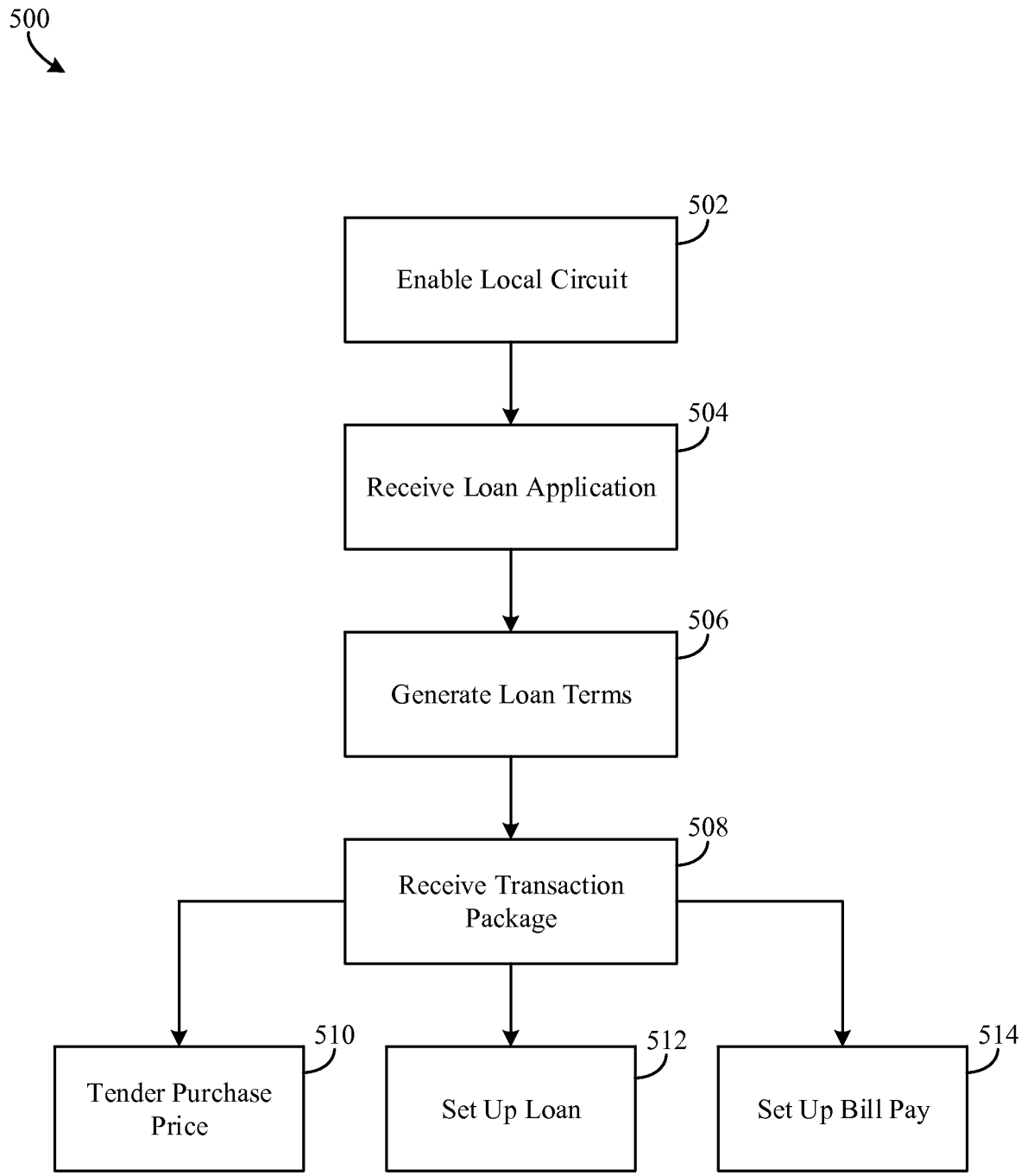
FIG. 5 is a flowchart of a method of completing a purchase transaction that includes a loan, according to an example embodiment.

Referring now to FIG. 5, a method 500 of completing a purchase transaction with a loan is shown. The method 500 is performed by processing and storage hardware at a financial institution computing system (e.g., financial institution computing system 108), as executed by one or more logics configured to perform the functions described below.

At 502, a local circuit (e.g., the local customer circuit 202 or the local merchant circuit 212) is enabled. The local circuit can be embodied as a processor and instructions stored in non-transitory memory that are executed by the processor to perform functions to facilitate a purchase transaction that includes the use of a loan. The financial institution computing system can enable the local circuit by making a software application available to be placed on a user device (e.g., the customer device 102 or the merchant device 104). For example, the financial institution computing system may make the software application available to be downloaded (e.g., via the financial institution's website, via an app store, or in another manner). Responsive to a user selection of an appropriate link, the software application can be transmitted to the user device and cause itself to be installed, thereby enabling the local circuit. In some arrangements, the financial institution computing system can enable the local circuit by providing a logic configured to perform the operations underlying the local circuit to a third party (e.g., a developer associated with a vendor) to be used into a local circuit provided by that third party (i.e., a local circuit provided by an entity that is not the financial institution itself, such as a vendor). In other arrangements, the local circuit can be enabled by providing a portal to a computing system configured to perform the operations provided by the local circuit, which is made available to the user device (e.g., a website).

At 504, a loan application is received. A loan application includes information and a request sufficient to allow a financial institution to determine whether a loan should be granted to the associated customer, and may be received by a transaction processing logic (e.g., the transaction processing logic 222). The financial institution computing system can receive the loan application over a network (e.g., the network 106, via the FI network logic 218). The loan application can include information relating to a contemplated customer purchase (e.g., an estimated purchase price, a desired loan amount, vendor information, etc.) and the subject customer. In some arrangements, the loan application is received as one or more tokens, which may be interpreted by an associated token provisioning logic (e.g., the token provisioning logic 220).

At 506, loan terms are generated. The loan terms are generated as a result of underwriting the loan application, and may be generated by a transaction processing logic (e.g., transaction processing logic 222). The loan terms can be generated based on a risk assessment of providing a loan to the customer identified from the loan application. For example, higher interest rates can be generated for higher risk customers, and lower interest rates can be generated for lower risk customers. Further, terms limiting additional terms such as the duration of the payment period, payment intervals, and loan amounts can reflect assessed customer risk as well. In some arrangements, the loan terms can be generated as a set of one or more tokens (e.g., where the transaction processing logic 222 operates in cooperation with the token provisioning logic 220), which may be transmitted to the user device.

At 508, a transaction package is received. A transaction package can include a set of loan terms that are approved by both the financial institution and the customer, down payment instructions as to the allocation and payment of the corresponding down payment, and a final purchase price. The transaction package may be received by a transaction processing logic (e.g., the transaction processing logic 222 via the FI network logic 218). In some arrangements, the transaction package includes terms of an approved loan, and instructions to obtain the corresponding down payment from one or more methods of payment (e.g., a credit card account, a checking account, and a gift card account). Further, in some arrangements, the transaction package is received as a set of one or more tokens, which may be interpreted by a token provisioning logic (e.g., token provisioning logic 220).

At 510, a purchase price is tendered. A transaction processing logic (e.g., the transaction processing logic 222) tenders the purchase price to a vendor corresponding to the transaction package by authorizing a transfer of funds totaling the purchase price to an account associated with the vendor. In some arrangements, the transaction processing logic tenders the purchase price to the vendor as a collective transaction from each of the methods of payment identified in the transaction package. In other arrangements, the transaction processing logic tenders the purchase price to the vendor first, and then collects funds from each of the methods of payment identified in the transaction package afterwards.

At 512, a loan is set up. A transaction processing logic (e.g., the transaction processing logic 222) sets up the loan by creating a new loan account at the financial institution (e.g., creating a new record in the account database 214) associated with the customer. The new loan account includes identifying information sufficient to identify the loan, the loan terms, and the customer. In some arrangements, the new loan account includes information relating to the transaction package, such that information relating to the nature of the associated purchase transaction can be retrieved (e.g., the total purchase price, the amount of down payment and the methods of payment used, and so on). Further, in some arrangements, the new loan account is set up to include information sufficient to show that the customer's purchased goods serve as collateral for the loan.

At 514, a bill pay feature is set up. A transaction processing logic (e.g., the transaction processing logic 222) sets up the bill pay feature by creating a new registered biller in an account database (e.g., account database 214) corresponding to the financial institution (i.e., where the financial institution issued the loan in the transaction package), thereby allowing the customer to cause the financial institution computing system to issue loan payments from the customer's payment accounts (e.g., payment accounts on record at the financial institution, such as checking accounts, credit card accounts, and so on). In some arrangements, the transaction processing logic further sets up an auto pay function, where loan payments are automatically withdrawn from the customer's payment accounts at each payment interval defined in the transaction package.

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems, methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A financial institution computing system, the system comprising:
    a token database configured to store information related to a plurality of tokens generated or interpreted by the financial institution computing system, each of the plurality of tokens representing a discrete, coded and/or encrypted segment of data that can be transmitted over a network and stored by devices including at least one of the financial institution computing system, a customer device of a customer, or a merchant device of a merchant;
    an account database configured to store information relating to at least one account associated with the customer; and
    one or more processors configured to execute logic to cause the one or more processors to:
        receive, over the network from the customer device of the customer, a loan application for a loan for purchase of a good or service by the customer from the merchant, including receiving at least one application token associated with the loan application,
        interpret, using the information related to the plurality of tokens stored in the token database, the at least one application token associated with the loan application,
        generate a plurality of loan terms for the loan application,
        generate and provide, over the network to the customer device of the customer, a respective loan term token for each of the plurality of loan terms for the loan application, wherein the customer selects and authorizes, via the customer device of the customer, a transaction package associated with at least one of the loan term tokens,
        generate and provide, over the network to the customer device of the customer, a payment token for paying loan proceeds of the loan to the merchant, wherein the customer selects and authorizes, via the customer device of the customer, a method of payment associated with the payment token for paying the loan proceeds to the merchant, and the customer transmits, via the customer device of the customer, the payment token to the merchant device,
        receive a transaction token corresponding to the selected transaction package over the network from said at least one customer device of said at least one customer, wherein the transaction token identifies a purchase price and at least one of the plurality of loan terms,
        receive the payment token for paying the loan proceeds to the merchant over the network from the merchant device of the merchant,
        interpret, using the information related to the plurality of tokens stored in the token database, the transaction token corresponding to the selected transaction package,
        interpret the payment token and recognize that the payment token corresponds to the selected payment method,
        tender, to the merchant device of the merchant, the loan proceeds according to the transaction package, and
        set up a the loan in the account database according to the transaction package.

2. The financial institution computing system of claim 1, wherein the one or more processors are further configured to execute the logic to cause the one more processors to set up a bill pay feature in the account database according to the loan.

3. The financial institution computing system of claim 2, wherein the one or more processors are further configured to execute the logic to cause the one more processors to set up the bill pay feature to include an auto pay function.

4. The financial institution computing system of claim 1, wherein the transaction package includes an approved loan package and down payment instructions directed to at least one method of payment.

5. The financial institution computing system of claim 4, wherein
    the one or more processors are further configured to execute the logic to cause the one more processors to complete the down payment instructions in order to tender the loan proceeds to the merchant.

6. The financial institution computing system of claim 1, wherein the at least one account associated with the customer comprises a credit card account of the customer.

* * * * *